US011220330B2

(12) United States Patent
De Meerschman

(10) Patent No.: US 11,220,330 B2
(45) Date of Patent: Jan. 11, 2022

(54) MECHANICAL MOTION TRANSMISSION SYSTEM AND AN AIRCRAFT FITTED WITH A CORRESPONDING SYSTEM

(71) Applicant: AIRBUS HELICOPTERS, Marignane (FR)

(72) Inventor: Olivier De Meerschman, Lambesc (FR)

(73) Assignee: AIRBUS HELICOPTERS, Marignane (FR)

( * ) Notice: Subject to any disclaimer, the term of this patent is extended or adjusted under 35 U.S.C. 154(b) by 680 days.

(21) Appl. No.: 15/700,359

(22) Filed: Sep. 11, 2017

(65) Prior Publication Data

US 2018/0072406 A1 Mar. 15, 2018

(30) Foreign Application Priority Data

Sep. 9, 2016 (FR) ........................................ 1601332

(51) Int. Cl.
*F16H 1/22* (2006.01)
*B64D 35/00* (2006.01)
*B64C 27/14* (2006.01)
*F16H 37/08* (2006.01)

(52) U.S. Cl.
CPC ............... *B64C 27/14* (2013.01); *F16H 1/22* (2013.01); *F16H 37/0826* (2013.01); *B64D 35/00* (2013.01)

(58) Field of Classification Search
CPC ......... B64C 27/12; B64C 27/14; B64D 35/00; B64D 35/04; B64D 35/08; F16D 41/08; F16D 41/02; F02C 7/32; F02C 3/107; F02D 2260/532
See application file for complete search history.

(56) References Cited

U.S. PATENT DOCUMENTS

| 2,416,689 | A | * | 3/1947 | Grady | ................... | B60K 6/36 |
| | | | | | | 416/129 |
| 2,644,535 | A | * | 7/1953 | Koup | ................... | F16D 33/00 |
| | | | | | | 416/32 |

(Continued)

FOREIGN PATENT DOCUMENTS

| EP | 3144222 | 3/2017 |
| FR | 2140107 | 1/1973 |

(Continued)

OTHER PUBLICATIONS

French Search Report for French Application No. FR 1601332, Completed by the French Patent Office dated May 31, 2017, 8 Pages.

*Primary Examiner* — Bobby Rushing, Jr.
(74) *Attorney, Agent, or Firm* — Brooks Kushman P.C.

(57) ABSTRACT

A mechanical system for transmitting rotary motion between firstly at least one inlet wheel driven in rotation by at least one engine, each inlet wheel being suitable for being driven in rotation by a corresponding dedicated engine, and secondly at least two distinct driven shafts of an accessory box, the at least one engine serving to drive rotation of one of the at least two driven shafts in isolation, or to drive the at least two driven shafts simultaneously, jointly with at least one aircraft rotor, the mechanical system including a selective rotary drive member that is movable axially between two distinct drive positions.

11 Claims, 4 Drawing Sheets

(56) References Cited

U.S. PATENT DOCUMENTS

| | | | | |
|---|---|---|---|---|
| 2,979,968 A * | 4/1961 | Beurer | ................... | F16H 37/00 |
| | | | | 74/665 GA |
| 3,362,255 A * | 1/1968 | De Rocca | ............... | F16H 37/00 |
| | | | | 74/665 L |
| 3,782,223 A * | 1/1974 | Watson | ................... | B64C 27/32 |
| | | | | 74/665 L |
| 4,489,625 A | 12/1984 | White | | |
| 4,783,023 A | 11/1988 | Jupe | | |
| 4,811,627 A * | 3/1989 | Mouille | ................. | B64C 27/12 |
| | | | | 244/60 |
| 6,098,921 A * | 8/2000 | Piasecki | ................. | B64C 27/14 |
| | | | | 244/17.19 |
| 6,394,387 B1 | 5/2002 | Mitrovic | | |
| 7,418,888 B2 | 9/2008 | Vialle | | |
| 8,027,772 B2 * | 9/2011 | Vialle | ................... | B60W 10/06 |
| | | | | 244/17.11 |
| 8,052,094 B2 * | 11/2011 | Roesch | ................... | B64C 27/26 |
| | | | | 244/177 |
| 8,439,631 B2 | 5/2013 | Bartolomeo et al. | | |
| 8,814,502 B2 * | 8/2014 | Eleftheriou | ............... | F02C 7/32 |
| | | | | 415/122.1 |
| 8,840,057 B2 * | 9/2014 | Moret | .................... | B64C 27/12 |
| | | | | 244/6 |
| 10,618,642 B2 * | 4/2020 | De Meerschman | ...... | F16H 1/28 |
| 2002/0084120 A1 * | 7/2002 | Beasley | ................... | B60K 6/36 |
| | | | | 180/65.25 |
| 2004/0237684 A1 * | 12/2004 | Bossler | .................. | B64C 27/14 |
| | | | | 74/423 |
| 2007/0125907 A1 | 6/2007 | Lappos et al. | | |
| 2017/0073066 A1 | 3/2017 | De Meerschman et al. | | |
| 2020/0109776 A1 * | 4/2020 | Mueller | ............. | F16H 57/0457 |

FOREIGN PATENT DOCUMENTS

| | | | | |
|---|---|---|---|---|
| FR | 2670553 | 6/1992 | | |
| FR | 2871138 | 12/2005 | | |
| GB | 1000430 A * | 8/1965 | ............ | B64C 27/12 |

* cited by examiner

MECHANICAL MOTION TRANSMISSION SYSTEM AND AN AIRCRAFT FITTED WITH A CORRESPONDING SYSTEM

CROSS-REFERENCE TO RELATED APPLICATIONS

This application claims priority to French patent application No. FR 16 01332 filed on Sep. 9, 2016, the disclosure of which is incorporated in its entirety by reference herein.

BACKGROUND OF THE INVENTION

(1) Field of the Invention

The present invention relates to the field of means for transmitting rotary motion between at least two members. More particularly, the invention relates to mechanisms for putting a rotary shaft selectively into communication with one or alternatively a plurality of drive sources. The invention relates to such a transmission mechanism for simultaneously driving accessories such as an alternator and/or a compressor from at least one engine used for driving rotation of an inlet wheel, and in particular a drive shaft of a rotorcraft rotor, selectively, in isolation or jointly.

(2) Description of Related Art

It should be recalled that in the field of rotorcraft, and in particular helicopters or the like, it is common practice to drive the rotor by means of a plurality of engines, and more particularly by means of two engines in particular. It should also be recalled that at least one of the engines is also used for driving accessories of the rotorcraft, such as an alternator or a compressor, for example. It should be observed at this stage in the description that the number of these accessories and their natures are not limiting on the scope of the present invention.

A general problem that arises lies in the two purposes of the engines of the rotorcraft, both for driving the rotor and, for at least one of them, for driving accessories. This problem is made that much more difficult to solve in that it is common to drive the accessories independently of the rotor while the rotorcraft is on the ground, while preparing for flight or on standby, in particular. For this purpose, it is common practice to use one of the engines for driving accessories arranged in an accessory box while the transmission of rotary motion between the rotor and the set of engines is interrupted.

More precisely, the engine used for driving the accessories is in communication firstly with a main drive shaft of the rotor via a selective drive member, such as a dog clutch mechanism or the like, and is in communication secondly with a secondary shaft for driving accessories. Those provisions are such that by operating the selective drive member, the member driving the accessories can alternate between either driving the accessories alone, or else driving the accessories jointly with the rotor.

In particular during a stage of preparing the rotorcraft, prior to setting the rotor in rotation, the connection between the accessory drive member and the main shaft is interrupted, with only the accessories being driven by the engine. Thereafter, once this stage of preparation has been completed, the connection between the accessory drive member and the rotor is set up via the selective drive member. More particularly, during a standby stage of the rotorcraft during which drive of the rotor is temporarily interrupted, the selective drive member is operated to interrupt the connection between the main shaft and the member used for driving the accessories, while the accessories nevertheless continue to be driven.

By way of example, patent FR 2 140 107 is known, which discloses a device having a large number of parts and which is found to be complex, bulky, and relatively fragile.

It should be observed at this stage of the description that it is also common practice to interpose rotary differential mechanisms, in particular overrunning clutches, i.e. freewheels, or the like between the engines and the main shafts associated therewith for driving the rotor. Such freewheels, which are made even more essential in that the rotor presents a large amount of inertia, seek to ensure that any difference in relative speed of rotation between the rotor and one or the other of the main shafts driving it in communication with a corresponding engine has no harmful effects. Nevertheless, it is common practice to move the selective drive member interposed between the main drive shaft of the rotor and the member for driving the accessories in an axial direction, and such a movement is made difficult if not impossible beyond an acceptable threshold for the difference in speed of rotation between the rotor and the engine driving the accessories.

In order to overcome this difficulty, when going from the position for driving accessories only to the position for driving the accessories jointly with the rotor, it is common practice to wait for this speed difference threshold to be reached before operating the selective drive member and causing the rotor to be driven from all of the engines. Conversely, when the rotor is being driven by all of the engines, the selective drive member is caused to move axially and then only the member driving the accessories is kept in operation. Moving the selective drive member is made difficult because of the difference in rotation between the various engines, in particular between the position for driving the accessories only and the position for driving them jointly with the rotor, so it is commonly accepted that it is necessary momentarily to interrupt the drive of the accessories, until sufficient harmonization is obtained between the drive speeds of the various rotary members relative to one another.

It has been found in use that such a general organization for the transmission mechanism is not entirely satisfactory, in particular because of the risk of losing the operation of the accessories during the above-mentioned stage of waiting for harmonization between the speeds, and/or in the event of a failure of any one of the engines. Specifically, an interruption in the drive of the accessories, even if it is only momentary, is harmful when the accessories include air conditioning or an alternator for powering members with memory, since there might be the consequence of losing information. Nevertheless, and in particular concerning the drawbacks that would be presented by undesirable extra weight, the practice in the field tends to ignore this lack of satisfaction.

This practice is accepted all the more since the constraints of operating the accessories, and in particular the alternator, impose minimum and maximum speed thresholds for driving them, thereby tending to increase the complexity of the structure of the transmission mechanism, making it out of the question to organize this structure in such a manner as to guarantee that accessory drive is maintained in any situation.

Furthermore, as described in Document FR 2 871 138, another solution is known for maintaining drive to the accessories of a rotorcraft, including during stages in which the accessories are being driven by the single engine that is allocated to them and/or jointly with the rotor. That solution enables the accessories to be driven by the engine in the usual selective drive mode of operation, and more particularly it enables them to be driven selectively in isolation by the drive member allocated to the accessories or jointly by all of the drive members for driving the rotor.

Nevertheless, although such a mechanism makes it possible to perform selective accessory drive operations without being subjected to the constraints of needing to interrupt the operation of the engines driving the rotor, the drive member allocated to the accessories while the aircraft is in flight has transmission shafts that are arranged coaxially on an axis of rotation of an inlet wheel. Such an arrangement is then not compatible with all aircraft that might be fitted with additional shafts for transmitting rotary motion to additional rotors, in particular propulsion rotors or rotors for controlling the yaw movement of a rotorcraft.

In addition, it is also known that the accessory box includes two distinct inlet shafts, these two shafts being fitted with respective freewheels.

This particular arrangement then allows for one of the inlet shafts of the accessory box being driven in rotation by an auxiliary drive train of the mechanical system when the main drive train is not being driven by the engine(s), or when the main drive train is transmitting a speed of rotation that is higher than that transmitted by the auxiliary drive train.

The present invention seeks more particularly to propose a solution that takes account of the rotary drive of a plurality of rotors that are movable in rotation about axes of rotation that are oriented in mutually distinct angular directions. The invention thus seeks to avoid the problems of interference between shafts suitable for driving rotation of various rotors having axes of rotation that are not mutually parallel.

Furthermore, other mechanical transmission systems are known that make use of bevel gears for driving a tail rotor, as described in Document US 2007/0125907, or indeed propulsive propellers and/or an accessory box, as described by the Applicant in Document EP 3 144 222.

Nevertheless, such mechanical systems are very different structurally and under no circumstances do they make it possible to satisfy the problems of interference between shafts suitable for driving rotation of various rotors that present axes of rotation that are not mutually parallel.

BRIEF SUMMARY OF THE INVENTION

The invention thus provides a mechanical system for transmitting rotary motion between firstly at least one inlet wheel driven in rotation by at least one engine, each inlet wheel being driven in rotation by a corresponding dedicated engine, and secondly at least two distinct driven shafts of an accessory box, the engine(s) serving to drive rotation of one of the at least two driven shafts in isolation, or to drive the at least two driven shafts simultaneously, jointly with at least one aircraft rotor. Such a mechanical system also includes a selective rotary drive member that is movable axially between two distinct drive positions:

a first drive position POS1 in which one of the engines drives both the rotor(s) and a first driven shaft of the accessory box in rotation simultaneously; and a second drive position POS2 in which one of the engines drives a second driven shaft of the accessory box in rotation, the second driven shaft being distinct from the first driven shaft.

Furthermore, the mechanical system also includes:

a bevel gear pair having intersecting axes, comprising a first bevel gear referred to as a "power" gear, having teeth, the first bevel gear being movable in rotation about a first axis, and a bevel wheel provided with teeth, the bevel wheel being movable in rotation about a second axis, the respective teeth of the first bevel gear and of the bevel wheel co-operating with in mutually complementary manner, the bevel wheel driving the rotor(s) in rotation; and a "takeoff" shaft constantly driven in rotation by the inlet wheel, the takeoff shaft serving to transmit rotary motion constantly to the second driven shaft of the accessory box without driving the bevel gear pair and the accessory gear in rotation while in the second drive position POS2 of the selective drive member, and when the engine drives rotation of the corresponding inlet wheel, the inlet wheel drives rotation of the takeoff shaft and of the second driven shaft of the accessory box.

According to the invention, such a mechanical system is remarkable in that it includes a second bevel gear referred to as an "accessory" gear having teeth meshing with the teeth of the bevel wheel, the accessory gear transmitting rotary motion to the first driven shaft of the accessory box;

the takeoff shaft is also arranged to rotate about a third axis of rotation distinct from the first axis of rotation, the third axis of rotation being arranged so that it does not coincide with the first axis of rotation.

Furthermore, the mechanical system is remarkable in that in the first drive position POST of the selective drive member and when the engine drives rotation of the corresponding inlet wheel, the inlet wheel drives rotation firstly of the bevel gear pair, of the accessory gear, and of the first driven shaft of the accessory box, and secondly simultaneously of the takeoff shaft and of the second driven shaft of the accessory box.

In other words, the use of an accessory gear directly driven in rotation by the bevel wheel serves to avoid using a transmission shaft arranged coaxially with the power gear. By way of example, such an accessory gear may then be arranged radially opposite the power gear for driving the bevel wheel in rotation.

Likewise, using a takeoff shaft that can be arranged in offset and non-coaxial manner relative to the first axis of rotation makes it possible to avoid interfering with a possible shaft of a bevel wheel secured to the bevel wheel and driven in rotation by the bevel wheel and/or driving the bevel wheel in rotation, such a bevel wheel shaft then being arranged on the same axis as the second axis of rotation about which the bevel wheel can rotate.

In practice, the third axis of rotation may be arranged parallel to a plane defined by the first and second intersecting axes of rotation and in non-coplanar manner.

Thus, the bevel wheel shaft can pass through the bevel wheel along the second axis of rotation and by way of example can co-operate at a first free end with a secondary mechanical system for driving rotation of an additional propulsion rotor. Such a mechanical system is then particularly suitable for transmitting rotary motion to at least two distinct rotors of a hybrid type rotorcraft.

Under such circumstances, the mechanical system serves to transmit rotary motion between a hybrid rotorcraft engine and a main, first rotor forming a rotary wing serving mainly to provide the hybrid rotorcraft with lift and in part to provide it with propulsion. Such a main rotor is thus driven in rotation by the bevel wheel forming a first bevel gear of a connection part referred to below as a "double" gear. Such a double gear includes a second bevel gear serving to drive rotation of an interlinking wheel and then the main rotor.

In parallel, such a mechanical system also makes it possible to transmit rotary motion between the engine of the hybrid rotorcraft and at least one propulsion, second rotor providing part of the propulsion of the hybrid rotorcraft. Such a propulsion, second rotor may be driven in rotation by a secondary mechanical system co-operating with the bevel wheel shaft arranged coaxially with the bevel wheel along the second axis of rotation, the bevel wheel shaft being secured to and driven in rotation by the bevel wheel. As mentioned above, such a secondary mechanical system enables the propulsion, second rotor of the hybrid rotorcraft to be driven in rotation, which may be arranged at a first free end of the bevel wheel shaft.

Advantageously, the selective drive member may be formed by an activatable freewheel, the activatable freewheel including a movable part actuated by an actuator selected from the group comprising hydraulically controlled actuators, pneumatically controlled actuators, and electrically controlled actuators.

Alternatively, such a movable part of the selective drive member may equally well be actuated manually by an operator, in particular using a lever and a linkage of links or rods for transmitting a force exerted manually on the lever to a movable element inside the selective drive member.

The movable part may in particular serve to index rotation of a cage inside the freewheel in order to deactivate the freewheel.

Such a selective drive member is described in greater detail in Document FR 2 670 553 and serves to allow or prevent relative rotation between two coaxial shafts that are movable in rotation about their common axis of rotation either independently or together.

In practice, the mechanical system may include adapter means for adapting a speed of rotation of the inlet wheel and for driving rotation of the takeoff shaft and of the second driven shaft of the accessory box.

Such adapter means for adapting a speed of rotation may in particular be in the form of a gear pair or a gear train. Furthermore, these adapter means also serve to offset the takeoff shaft and the third axis of rotation radially relative to the axis of rotation of the inlet wheel, referred to below in this application as the sixth axis of rotation.

Furthermore, in the first drive position POST of the selective drive member and at constant speed of rotation of the at least one engine, the adapter means may enable the second driven shaft of the accessory to be driven in rotation at a speed of rotation $\Omega_2$ that is distinct from a speed of rotation $\Omega_1$ of the first driven shaft of the accessory box.

Under such circumstances, members having a speed of rotation differential, such as freewheels in particular, may be present in the accessory box so as to enable accessories to be driven automatically either by the power gear, the bevel wheel, and the accessory gear, or else by the takeoff shafts, as a function of the difference in speeds of rotation between the first and second driven shafts.

According to another advantageous characteristic of the invention, the first and second driven shafts of the accessory box may be movable in rotation about respective fourth and fifth axes of rotation that are mutually parallel.

Such an arrangement enables the design of such an accessory box to be simplified considerably. Positioning the fourth and fifth axes of rotation in parallel makes it possible to limit the corresponding number, the weight, and size of the means for transmitting rotary motion inside the accessory box.

Advantageously, the inlet wheel may be movable in rotation about a sixth axis of rotation, with the fourth and fifth axes of rotation being arranged parallel to the sixth axis of rotation.

This particular arrangement serves to simplify the design of the mechanical system for transmitting rotary motion. More particularly, such an arrangement makes it possible to avoid using bevel gears to form the adapter means. Such speed adapter means can then be made using gears presenting pitch surfaces that are cylindrical, with teeth that are straight or helical and with axes of rotation that are parallel.

The present invention also provides an aircraft including at least one engine and at least one rotor for providing the aircraft with propulsion and/or lift.

According to the invention, the aircraft is remarkable in that it includes at least one mechanical system as described above, the mechanical system serving to transmit rotary motion between a drive shaft of the engine(s) and a driven shaft of the rotor(s).

As mentioned above, such an aircraft may in particular be in the form of a rotorcraft, or indeed more particularly in the form of a hybrid rotorcraft.

BRIEF DESCRIPTION OF THE DRAWINGS

The invention and its advantage appear in greater detail from the context of the following description of examples given by way of illustration and with reference to the accompanying figures, in which.

DETAILED DESCRIPTION OF THE INVENTION

Elements present in more than one of the figures are given the same references in each of them.

As mentioned above, the invention relates to a mechanical system and to an aircraft fitted with such a mechanical system.

Figure 1:
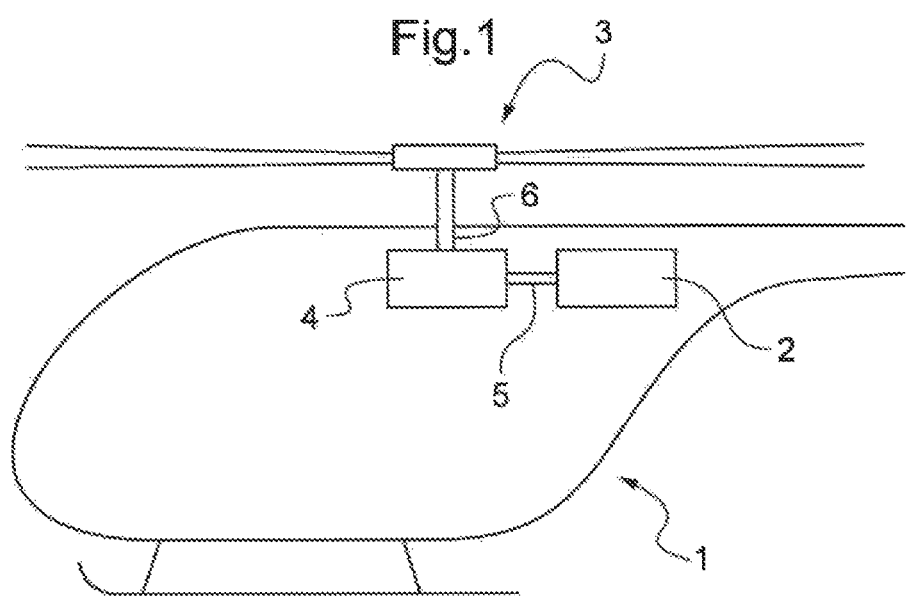
FIG. 1 is a perspective view of an aircraft fitted with a mechanical system in accordance with the invention.

As shown in FIG. 1, the aircraft 1 may be in the form of a rotorcraft and have an engine 2 such as a combustion engine or a turbojet. The engine 2 then serves to drive a drive shaft 5 in rotation and a mechanical system 4 serves to transmit the rotary motion of the drive shaft 5 to a driven shaft 6 with a change in angular orientation between the respective axes of rotation of the drive shaft 5 and the driven shaft 6.

Such a driven shaft 6 then serves to drive rotation of at least one rotor 3 having blades for providing the aircraft 1 with lift and/or propulsion. Advantageously, the mechanical system 4 also serves to reduce the speed of rotation of the driven shaft 6 compared with the speed of rotation of the drive shaft 5.

Figure 2:
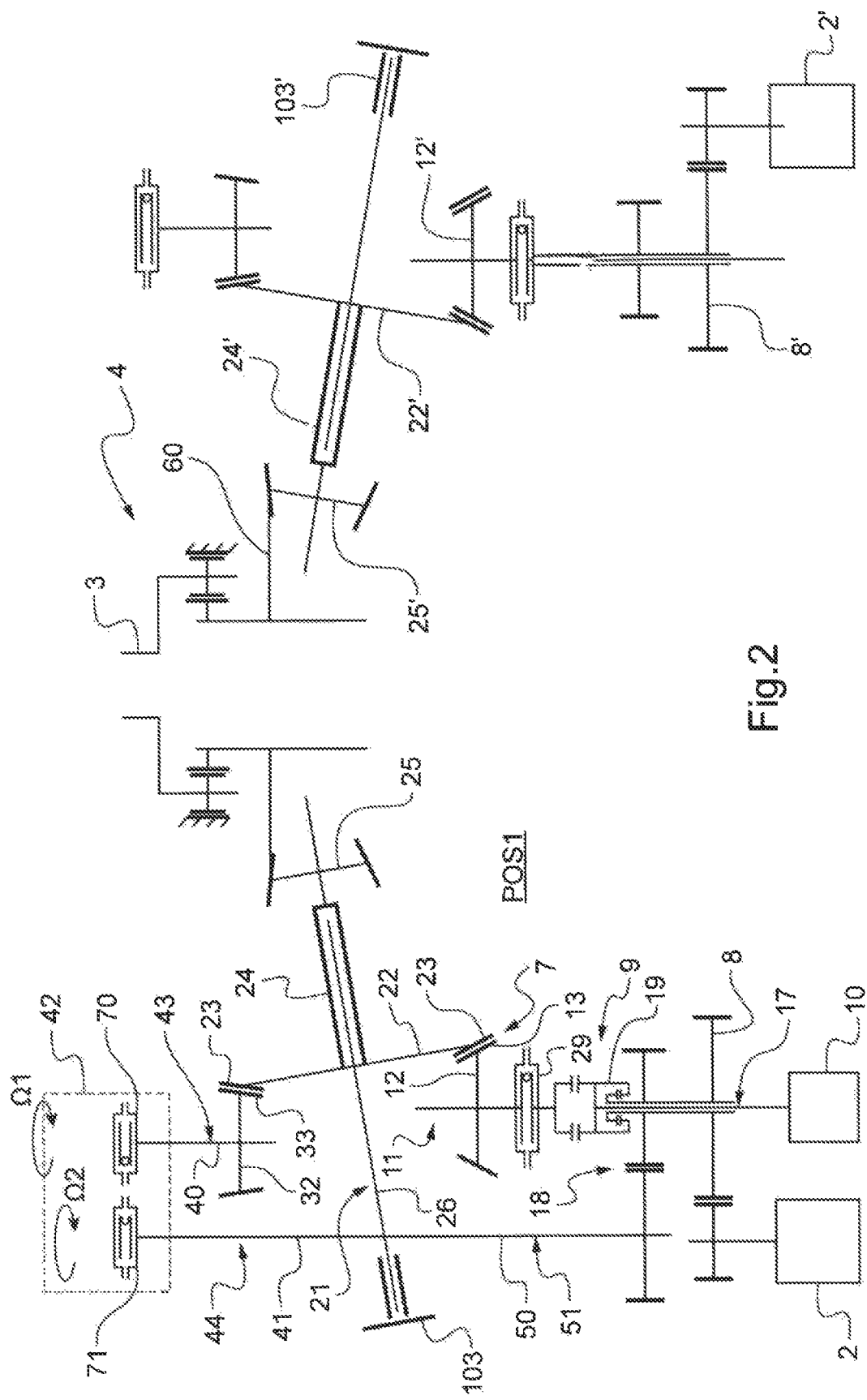
FIGS. 2 and 3 are theoretical diagrams showing the operation of a first embodiment of a corresponding mechanical system, shown respectively in two positions POS1 and POS2 of the selective rotary drive member, in accordance with the invention.
Figure 3:
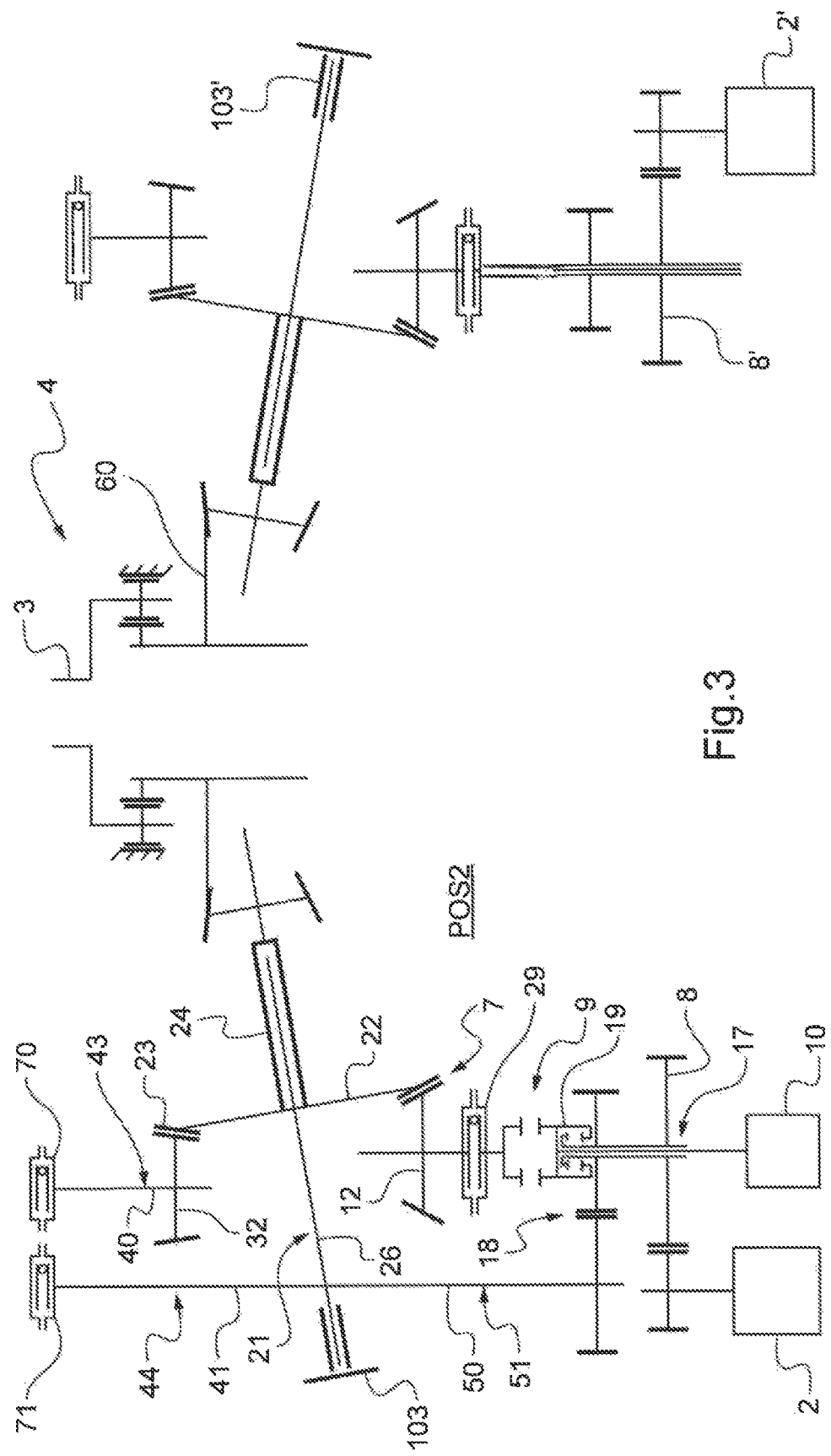

As shown diagrammatically in FIGS. 2 and 3, in a first embodiment of a mechanical system 4, a plurality of shafts or gears are movable in rotation about various different axes of rotation. In order to simplify the representation of the mechanical system 4, some of the axes are shown as being coplanar and capable of crossing, which is naturally not possible physically.

Such a mechanical system 4 for transmitting rotary motion thus serves to transmit rotary motion between firstly at least one inlet wheel 8, 8' driven in rotation by at least one engine 2, 2', each inlet wheel 8, 8' being driven in rotation by a respective one of the engines 2, 2', and secondly at least two distinct driven shafts 40, 41 of an accessory box 42. In this first embodiment, the at least two drive shafts 41 and 42 of the driven box 42 are arranged in parallel.

The engine(s) 2, 2' thus serves to drive rotation of at least one of the two driven shafts 40, 41 in isolation or to drive both driven shafts 40 and 41 simultaneously while jointly driving at least one rotor 3, 103, 103' of the aircraft 1. In this embodiment, the rotor 3 may be the main rotor for providing a hybrid rotorcraft with propulsion and/or lift, while the two rotors 103 and 103' are two rotors for propelling the hybrid rotorcraft.

As shown, such a mechanical system 4 also has a selective rotary drive member 9 that is axially movable between two distinct drive positions:

a first drive position POST, shown in FIG. 2, in which the engine 2 drives rotation both of the rotor(s) 3, 103, 103' and of a first driven shaft 40 of the accessory box 42; and a second drive position POS2, shown in FIG. 3, in which the engine 2 drives a second drive shaft 41 of the accessory box 42 in rotation, where the second drive shaft 41 is distinct from the first drive shaft 40.

Furthermore, such a mechanical system 4 also has a bevel gear pair 7 with intersecting axes 11 and 21 made up of a first bevel gear 12 referred to as a "power" gear having teeth 13 and that is movable in rotation about a first axis 11, and a bevel wheel 22 having teeth 23 and that is movable in rotation about a second axis 21. The respective teeth 13 and 23 of the first bevel gear 12 and of the bevel wheel 22 are then suitable for co-operating in mutually complementary manner. The bevel wheel 22 is then suitable for driving the rotors 3, 103, and 103' in rotation.

In addition, the mechanical system 4 has a second bevel gear 32, referred to as the "accessory" gear, having teeth 33 meshing with the teeth 23 of the bevel wheel 22. Such an accessory gear 32 is also suitable for transmitting rotary motion to the first driven shaft 40 of the accessory box 42. Furthermore, the speed of rotation of the first driven shaft 40 may advantageously be distinct from the speed of rotation of the bevel gear 12 while conserving a parallel orientation between the first axis 11 and a fourth axis of rotation 43 about which the first driven shaft 40 rotates.

Furthermore, the mechanical system 4 also includes a "takeoff" shaft 50 that is designed to be driven constantly in rotation by the inlet wheel 8. Such a takeoff shaft 50 then serves to transmit rotary motion continuously to the second drive shaft 41 of the accessory box 42 without driving the bevel gear pair 7 and the accessory gear 32 in rotation. In this example, the takeoff shaft 50 is shown as being movable in rotation about a third axis of rotation 51 that is distinct from the first axis of rotation 11.

Such first and second driven shafts 40 and 41 can then be arranged so as to be free to rotate respectively about fourth and fifth axes of rotation 43 and 44 that are mutually parallel but that do not coincide, as shown in the first embodiment of the mechanical system 4.

Such a third axis of rotation 51 is then arranged so that it does not coincide with the first axis of rotation 11, thereby avoiding any problem of interference with a bevel wheel shaft 26. Specifically, such a particular arrangement enables the third axis of rotation 51 to be positioned parallel to a plane defined by the first and second intersecting axes of rotation 11 and 21, without being coplanar therewith. As mentioned above, for reasons of simplifying the representation, the third axis of rotation 51 is shown, erroneously, as being coplanar with the first and second axes of rotation 11 and 21, but that does not correspond to reality since the second axis of rotation 21 and the third axis of rotation 51 cannot intersect.

In addition, as shown in FIG. 2, when the selective drive member 9 is arranged in the first drive position POS1, the inlet wheel 8 then drives in rotation firstly the bevel gear pair 7, the accessory gear 32, and the first driven shaft 40 of the accessory box 42, and simultaneously also drives in rotation the takeoff shaft 50 and the second driven shaft 41 of the accessory box 42.

Such a first drive position POS1 thus corresponds to the rotorcraft in a state of flight since it serves to drive rotation of the main rotor 3 enabling the rotorcraft at least to be provided with lift.

An actuator 10 then enables the selective drive member 9 to be controlled using a rod held in a predetermined position. The actuator may itself be controlled by means of a hydraulic control, for example.

Furthermore, such a selective drive member 9 may advantageously be formed by an activatable freewheel corresponding to a freewheel 29 that is activated or not activated by means of a movable part 19 forming dog clutch means between the freewheel 29 and a gear secured to the inlet wheel 8.

Furthermore, the rod may be arranged coaxially with the inlet wheel 8, thus enabling the selective drive member 9 and more particularly the movable part 19 to be maintained in its first drive position POS1. Such a rod is then arranged on a sixth axis of rotation 17 of the inlet wheel 8.

Such a sixth axis of rotation 17 is then advantageously arranged parallel to the fourth and fifth axes of rotation 43 and 44.

Furthermore, the mechanical system 4 has adapter means 18, such as a pair of gears on parallel axes of rotation, for reducing or increasing the speed of rotation of the inlet wheel 8 and for driving the takeoff shaft 50 and the second driven shaft 41 of the accessory box 42 in rotation.

Consequently, when the selective drive member 9 is placed in the first drive position POS1 and the engine 2 is rotating at a constant speed of rotation, the adapter means 18 can enable the second driven shaft 41 of the accessory box 42 to be driven in rotation at a speed of rotation $\Omega_2$ that is different from the speed of rotation $\Omega_1$ of the first driven shaft 40 of the accessory box 42.

Furthermore, freewheels 70 and 71 are then arranged in the accessory box 42 so as to give precedence to the accessories being driven in rotation by the first driven shaft 40 if it is being driven by the bevel wheel 22.

As shown in FIG. 3, when the selective drive member 9 is arranged in the second drive position POS2, the inlet wheel 8 then drives the takeoff shaft 50 and the second driven shaft 41 of the accessory box 42 in rotation without passing via the bevel gear pair 7, the accessory gear 32, or the first driven shaft 40.

In outline, in this second drive position POS2, the actuator 10 keeps the rod in a position that enables the part 19 of the freewheel 29 to be spaced apart from the gear driven by the inlet wheel 8. For simplification and comprehension purposes, such a movable part 19 is shown herein as being a part that is outside the freewheel 29, however in another variant, such a movable part 19 could equally well be arranged inside the freewheel in order to enable balls or rolling elements that it includes to be moved and held in position.

Such a second drive position POS2 then corresponds to a state of the rotorcraft being on the ground since the engine 2 can then no longer drive rotation of the main rotor 3 of the rotorcraft.

Furthermore, the bevel wheel 22 may form one of two elements meshing with a single-piece transmission member 24 referred to as a "double" gear. A gear 25 thus rotates together with the bevel wheel 22 and co-operates with the teeth of an interlinking wheel 60 suitable for driving at least one main rotor 3 in rotation.

As shown, such an interlinking wheel 60 may also co-operate with the teeth of another gear 25' of a second double gear 24'.

Under such circumstances and by analogy, another engine 2' can also serve to drive in rotation another inlet wheel 8', another power gear 12', and another bevel wheel 22' that is complementary to the second double gear 24'.

Thus, such a particular embodiment makes it possible, when the selective drive member 9 is arranged in the first drive position POS1, to mitigate a potential failure of one of the two engines 2, 2' in order to enable the first driven shaft 40 of the accessory box 42 to be driven constantly in rotation in flight by one or the other of the two engines 2 and 2'.

Figure 4:
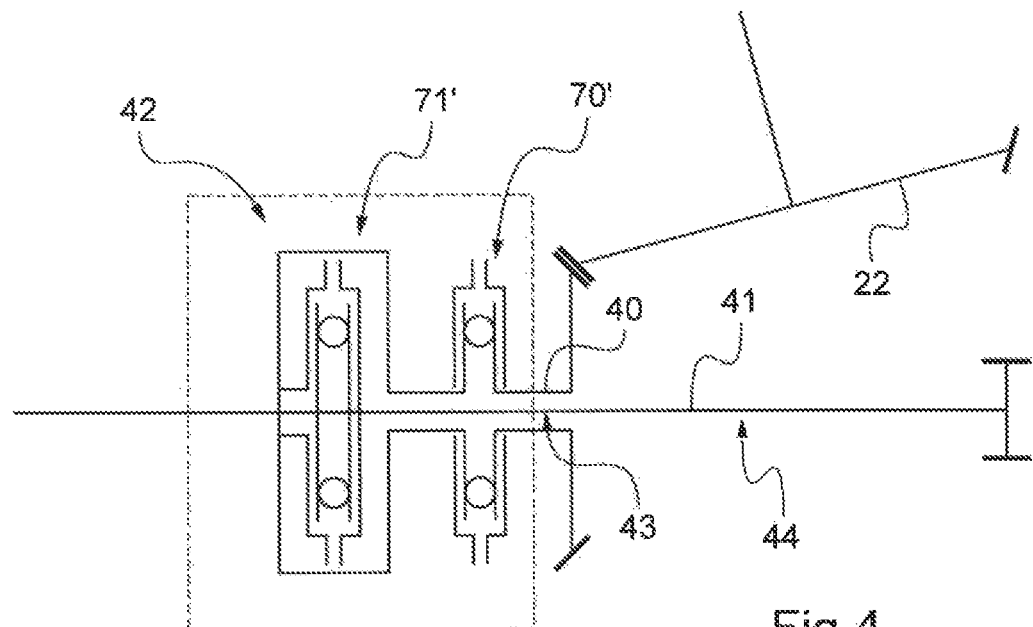
FIG. 4 is a diagrammatic side view of a second embodiment of a mechanical system in accordance with the invention.

In a second embodiment of the mechanical system 4 as shown in FIG. 4, the first and second driven shafts 40 and 41 may also be arranged so as to be free to rotate respectively about fourth and fifth axes of rotation 43 and 44 that coincide, by using shafts that are coaxial.

As above, freewheels 70' and 71' are then arranged in the accessory box 42 so as to give precedence to the accessories being driven in rotation by the first driven shaft 40 if it is being driven by the bevel wheel 22.

Figure 5:
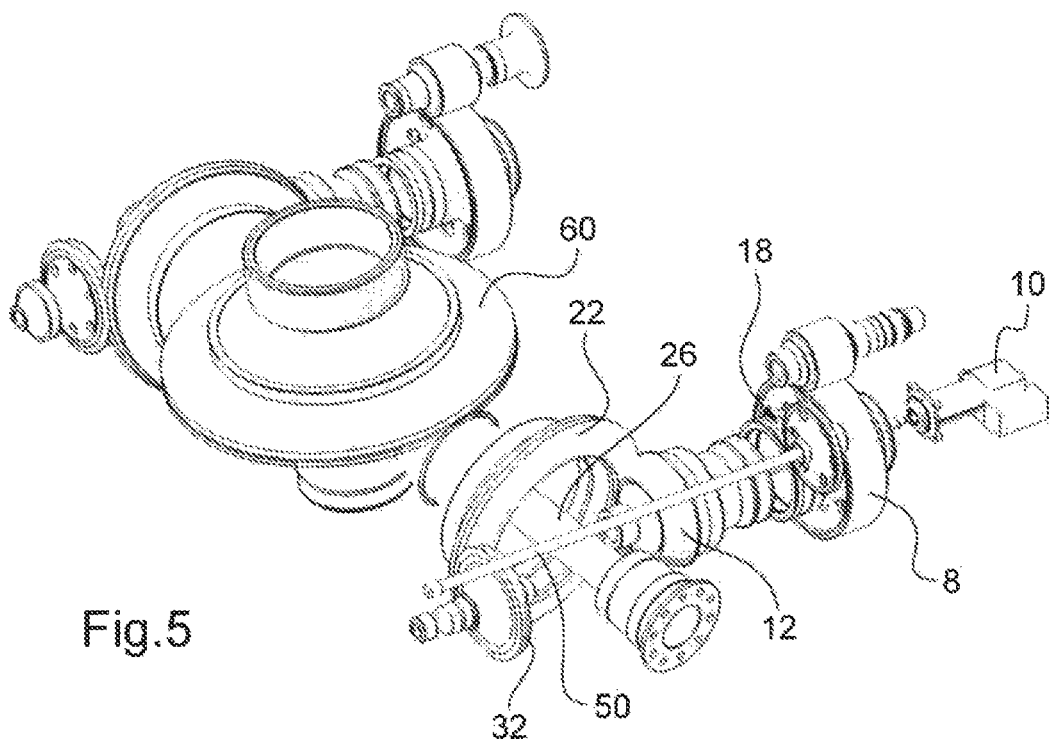
FIG. 5 is a perspective view showing the first embodiment of the mechanical system.

As shown in FIG. 5, the takeoff shaft 50 is shown offset relative to the sixth axis of rotation 17 of the inlet wheel 8. Such a lateral offset of the takeoff shaft 50 makes it possible to avoid interfering with the bevel wheel shaft 26 driven in rotation by the bevel wheel 22.

Furthermore, such a lateral offset of the takeoff shaft 50 is obtained by the adapter means 18 serving to reduce or increase the speed of rotation of the takeoff shaft 50 relative to the speed of rotation of the inlet wheel 8.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A mechanical system for transmitting rotary motion between at least one engine and at least two distinct driven shafts of an accessory box, wherein the at least two driven shafts for transmitting rotary motion to two propulsion rotors in a hybrid rotorcraft that does not include a tail rotor shaft, the at least one engine serving to drive rotation of one of the at least two driven shafts in isolation, or to drive the at least two driven shafts simultaneously together with at least one aircraft rotor, the mechanical system including a selective rotary drive member that is movable axially between two distinct drive positions, the mechanical system comprising:

an inlet wheel adapted to be driven in rotation by the engine;
    a first drive position in which one of the at least one engine drives both the at least one rotor and a first driven shaft of the accessory box in rotation simultaneously; and
    a second drive position in which one of the at least one engine drives a second driven shaft of the accessory box in rotation, the second driven shaft being distinct from the first driven shaft;
    a first bevel gear having teeth, the first bevel gear being movable in rotation about a first axis;
    a bevel wheel provided with teeth, the bevel wheel being movable in rotation about a second axis intersecting the first axis of the first bevel gear, the respective teeth of the first bevel gear and of the bevel wheel co-operating with in mutually complementary manner, the bevel wheel driving the at least one rotor in rotation;
    a second bevel gear having teeth meshing with the teeth of the bevel wheel and transmitting rotary motion to the first driven shaft of the accessory box; and
    a takeoff shaft constantly driven in rotation by the inlet wheel, the takeoff shaft serving to transmit rotary motion constantly to the second driven shaft of the accessory box without driving the first bevel gear, the bevel wheel and the second bevel gear in rotation while in the second drive position of the selective drive member, and when the engine drives rotation of the inlet wheel, the inlet wheel drives rotation of the takeoff shaft and of the second driven shaft of the accessory box;
    wherein the takeoff shaft is arranged to rotate about a third axis of rotation distinct from the first axis of rotation, the third axis of rotation being arranged so that it does not coincide with the first axis of rotation; and
    wherein in the first drive position of the selective drive member, the inlet wheel simultaneously drives rotation of 1) the first bevel gear, the bevel wheel and the second bevel gear to drive the first driven shaft of the accessory box, and 2) the takeoff shaft to simultaneously drive the second driven shaft of the accessory box.

2. The mechanical system according to claim 1, wherein the third axis of rotation is arranged parallel to a plane defined by the first and second intersecting axes of rotation and in non-coplanar manner.

3. The mechanical system according to claim 1, wherein the selective drive member is formed by an activatable freewheel, the activatable freewheel including a movable part actuated by an actuator selected from the group comprising hydraulically controlled actuators, pneumatically controlled actuators, and electrically controlled actuators.

4. The mechanical system according to claim 1, wherein the mechanical system includes a pair of gears for adapting a speed of rotation of the inlet wheel and for driving rotation of the takeoff shaft and of the second driven shaft of the accessory box.

5. The mechanical system according to claim 4, wherein, in the first drive position of the selective drive member and at constant speed of rotation of the at least one engine, the pair of gears enable the second driven shaft of the accessory to be driven in rotation at a speed of rotation $\Omega 2$ that is distinct from a speed of rotation $\Omega 1$ of the first driven shaft of the accessory box.

6. The mechanical system according to claim 1, wherein the first and second driven shafts of the accessory box are movable in rotation about respective fourth and fifth axes of rotation that are mutually parallel.

7. The mechanical system according to claim 6, wherein the inlet wheel is movable in rotation about a sixth axis of rotation, with the fourth and fifth axes of rotation being arranged parallel to the sixth axis of rotation.

8. An aircraft having at least one engine and at least one rotor for providing the aircraft with propulsion and/or lift, wherein the aircraft includes at least one mechanical system according to claim 1, the mechanical system serving to transmit rotary motion between a drive shaft of the at least one engine and a driven shaft of the at least one rotor.

9. A mechanical system for transmitting rotary motion from an engine and driving at least two distinct driven shafts of an accessory box and driving two propulsion rotors in a hybrid rotorcraft without a tail rotor, the two rotors providing propulsion and controlling yaw movements of the hybrid rotorcraft, the mechanical system comprising:

an inlet wheel adapted to be driven in rotation by the engine;

a main drivetrain connected to the inlet wheel and adapted to drive the first driven shaft of the accessory box, the main drivetrain comprising:
  a first bevel gear having teeth, the first bevel gear being movable in rotation about a first axis;
    a bevel wheel movable in rotation about a second axis intersecting the first axis of the first bevel gear, wherein the first bevel gear cooperates with the bevel wheel to drive the bevel wheel, the bevel wheel adapted to thereby drive the at least one rotor in rotation;
    a second bevel gear cooperating with the bevel wheel and adapted to transmit rotary motion to the first driven shaft of the accessory box;

an auxiliary drive train connected to the inlet wheel having a takeoff shaft adapted to transmit rotary motion constantly to the second driven shaft of the accessory box, wherein the takeoff shaft is arranged to rotate about a third axis of rotation distinct from and does not coincide with the first axis of rotation; and a selective rotary drive member that is movable axially between a first drive position and a second drive position, wherein in the first drive position of the selective drive member, the inlet wheel simultaneously drives rotation of main drivetrain and the auxiliary drivetrain.

10. The mechanical system according to claim 9, wherein the mechanical system includes a pair of gears connected to drive the first driven shaft at a first speed of rotation and drive the second driven shaft at a second speed different than the first speed.

11. The mechanical system according to claim 10, wherein, in the first drive position of the selective drive member and at constant speed of rotation of the at least one engine, the pair of gears enable the second driven shaft of the accessory to be driven in rotation at a speed of rotation $\Omega 2$ that is distinct from a speed of rotation $\Omega 1$ of the first driven shaft of the accessory box.

\* \* \* \* \*